May 3, 1927.
C. O. ANDERSON
1,627,305
LOAD ADJUSTED BRAKE MECHANISM
Filed July 26, 1926    2 Sheets-Sheet 1
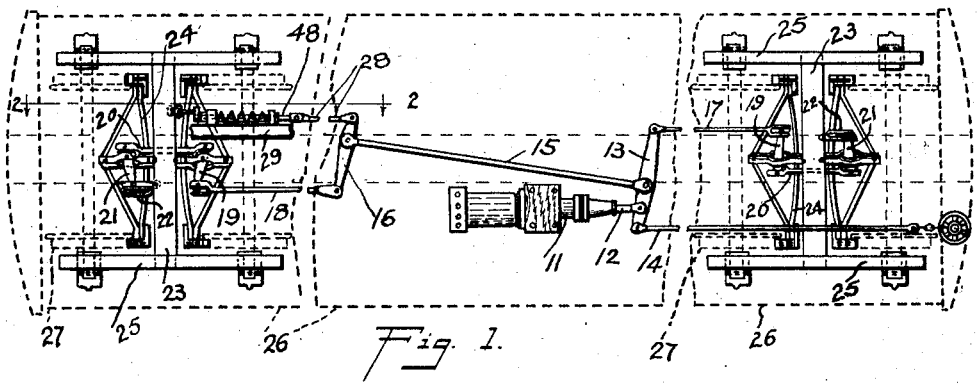
Fig. 1.
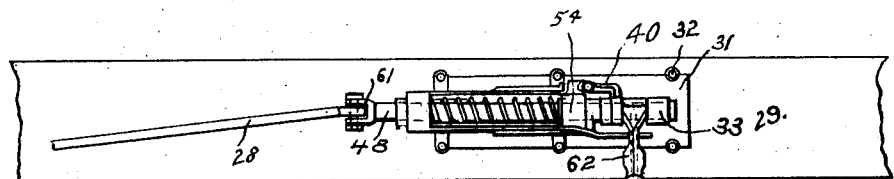
Fig. 2.
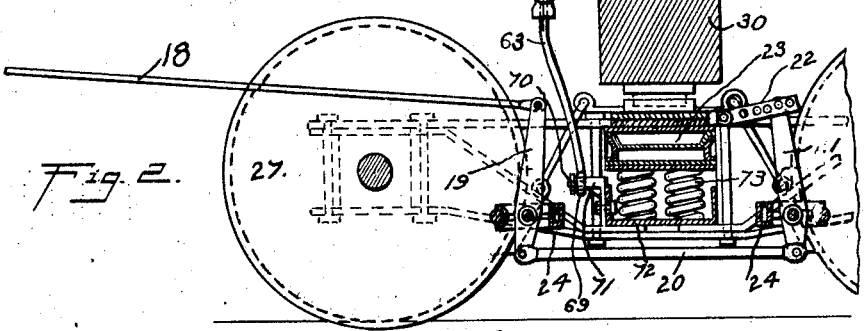
Fig. 3.
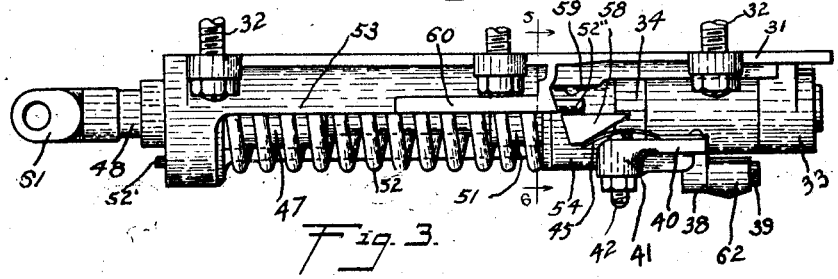
Fig. 3.A.
Inventor:
Chas. O. Anderson.
By David O. Barnell
Attorney.

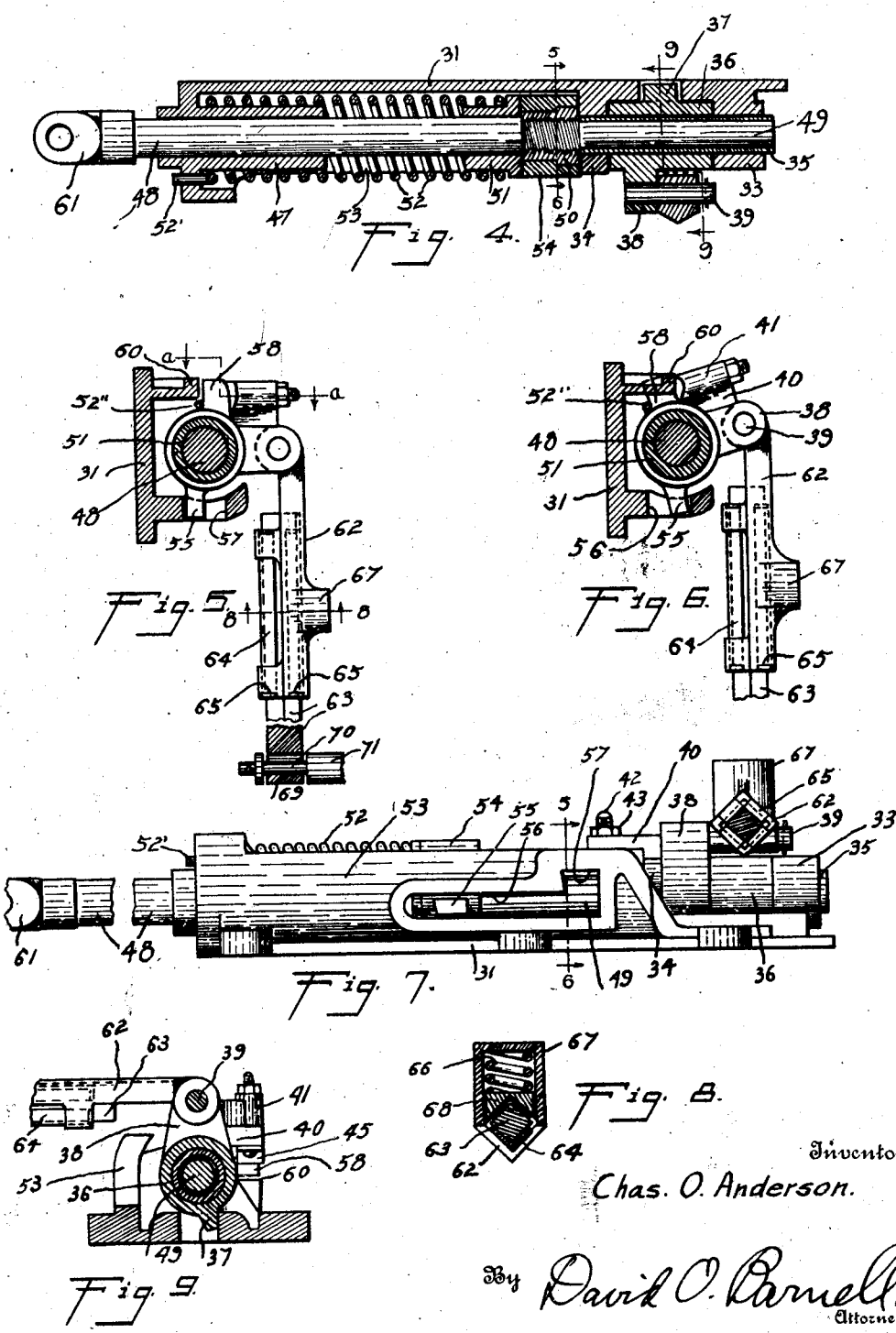

Patented May 3, 1927.

1,627,305

UNITED STATES PATENT OFFICE.

CHARLES O. ANDERSON, OF OMAHA, NEBRASKA.

LOAD-ADJUSTED BRAKE MECHANISM.

Application filed July 26, 1926. Serial No. 125,024.

My invention relates to railway brake mechanism, and particularly to means for automatically adjusting the braking power, or applied braking pressure of air-brakes, according to the load. It is the object of my invention to provide a mechanism of this class which may be readily applied to the standard brake rigging of freight cars and the like, and which will operate to shorten the travel of the brake-piston when the car is loaded, or to permit greater travel of the brake-piston when the car is empty. A further object of my invention is to provide in a mechanism of this class means for automatically compensating for variations in the relation of the car-body to the wheels, or unsprung portion of the trucks, other than those caused by loading of the car. Such variations are caused by sag or permanent shortening of the truck-springs, by wear and deformations of the truck-frames, by shimming up of the spring-seats to aline the car-couplers, by swaying and jolting of the car while in transit, by uneven distribution of the load upon the car, or by combinations of these various causes; and my invention provides means whereby any of such variations are automatically compensated, and so that the adjustment of braking power will be effected solely by variations of the load, and not by any of the several accidental or incidental causes which may result in either momentarily or permanently changing the relation of the car-body to the unsprung portion of the truck. A further object of my invention is to provide means enabling a proper operation of the load-controlled adjusting mechanism when a car is loaded or unloaded while the brakes are applied. More particular objects of my invention will appear hereinafter.

In the accompanying drawings Fig. 1 is a diagrammatic plan view of brake rigging for a freight car, showing the application of my load-controlled power-adjusting means thereto, Fig. 2 is a vertical section on the line 2—2 of Fig. 1, Fig. 3 is a detail plan view of the power-adjusting device alone, Fig. 3ª is a detail horizontal section of the rocker-arm on the line $a$—$a$ of Fig. 5, Fig. 4 is a horizontal axial section of the power-adjusting device, Figs. 5 and 6 are detail transverse sections on the lines 5—6 of Figs. 3, 4 and 7, showing the positions of the parts for light and loaded operations respectively, Fig. 7 is a bottom view of the device, showing the positions of the parts when the brakes are applied on an empty or lightly loaded car, Fig. 8 is a detail transverse section on the line 8—8 of Fig. 5, and Fig. 9 is a detail transverse section on the line 9—9 of Fig. 4.

Referring to Fig. 1, there are indicated the principal portions of the air-brake mechanism for a railway car, said mechanism including the brake-cylinder 11, the piston-rod 12 which is connected with the cylinder-lever 13, the hand-brake connection 14 to the end of the cylinder-lever, the rod 15 connecting the cylinder-lever with the equalizing-lever 16, the rods 17 and 18 which connect the cylinder-lever and equalizing-lever respectively with the live truck-levers 19, the rods 20 which connect the live truck-levers with the dead truck-levers 21, the dead-lever guides 22 which connect said levers with the bolster 23, the brake-beams 24, and the side-frames 25 of the trucks. The car-body 26 and wheels 27 are represented in Fig. 1 by dotted lines only.

In the ordinary construction of brake mechanism of this type, that end of the equalizing-lever 16 opposite the truck-lever-connection 18 is connected pivotally with a fixed guide or fulcrum-plate secured upon the adjacent lower portion of the car-body; but in applying my invention to the brake mechanism, said end of the lever 16 is pivotally connected with the end of a rod 28 which extends to the load-controlled power-adjusting device. The latter is secured to the side of one of the sills 29 of the car-body, adjacent to the bolster 30 above one of the car-trucks, as shown in Fig. 2.

Referring now more particularly to the power-adjusting device, as shown in detail in Figs. 3 to 9, inclusive, there is provided a frame-portion having a back-plate 31 with lugs at the sides thereof for receiving the bolts 32 by which it is secured to the sill 29. Lugs 33 and 34 are formed integrally with the plate 31 near one end thereof, and in said lugs are secured the ends of the tubular shaft 35, on which the rocker-hub 36 is mounted between said lugs 33 and 34. At the inner side of the rocker-hub is a lug 37 which extends into an opening in the back-plate, as shown in Figs. 4 and 9, and serves to limit motion of the rocker about the tubular shaft 35. At the outer side of the rocker-hub is a short arm 38, said arm carrying the pins 39 to which the upper end of the truck-connection is pivotally connected. At the upper side of the rocker-hub is an arm 40 which extends longitudinally above the lug 34, and at its end has the head 41 in which is carried the latch-pin 42. The latter passes slidably through the head 41, its outer end being threaded and provided with an adjusting-nut 43, the inner end having a rounded head 44 which engages the flexible latch-plate 45, being pressed toward the same by the coil spring 46 disposed in a counterbore in the head as shown in Fig. 3ª. The latch-plate 45 is secured at one end to the inner side of the arm 40, and the free end of the plate, adjoining the latch-pin, is curved outwardly about the end of the head 41.

A tubular guide 47 is formed integrally with the back-plate 31 at the end opposite the lug 33, and a rod 48 extends slidably through said guide, said rod having a reduced end-portion 49 fitting slidably within the tubular shaft 35, which is axially alined with the guide 47. Adjacent to the reduced end 49 the rod 48 has a threaded portion which is screwed into a shouldered cylindrical nut 50. Adjoining said nut a flanged collar 51 is disposed upon the rod 48, and said collar is engaged by a large coil spring 52 which fits over the same and against the flange thereof, the longitudinal expansive force of said spring normally holding the collar against the nut 50 and pressing the nut against the lug 34. The opposite end of the spring 52 extends about a portion of the guide 47, and the spring is partially housed by a cylindro-segmental flange 53 formed integrally with the guide and back-plate, portions of said housing-flange being extended longitudinally to the lug 34. The swivel-block 54 is disposed loosely about the shouldered nut 50, the length of said swivel-block being slightly less than that of the nut, whereby to prevent the block being clamped longitudinally between the lug 34 and the flanged end of the spring-collar 51. At its lower side the swivel-block has a lug 55 which extends into a longitudinal slot 56 in the housing-flange 53, said lug being normally positioned in register with a notch or laterally offset portion 57 at the end of the slot adjoining the lug 34. At the upper side of the swivel-block is a lug 58, which has a beveled outer face adapted for engagement with the latch-plate 45. Said lug 58 is normally positioned in register with a notch 59 in the upper portion of the housing-flange, at the end of thickened portion or rail 60, formed at the outer edge of said flange as shown in Figs. 3, 5 and 6. An end 52' of the spring 52 is attached to the guide 47, as shown in Fig. 4, and the other end of said spring, designated as 52'', is extended past the flange of the collar 51 and behind the lug 58 of the swivel-block.

The spring 52 is under a torsional stress such that the end 52'' presses against the lug 58 and tends to rotate the swivel-block in a clockwise direction as viewed in Figs. 5 and 6, thereby holding the lug 55 normally in line with the slot 56, and holding the lug 58 in front of the rail 60, or in the relations shown in Fig. 5.

The position of the swivel-block is controlled by movements of the rocker, formed by the hub 36 and arms 38 and 40, and the rocker is actuated by the truck-connection to the pin 39 on the arm 38. Upon said pin 39 is pivoted the upper end of the clutch-sleeve 62, the lower portion of said sleeve being substantially rectangular in transverse section, and having therein a rectangular longitudinal opening in which is inserted the squared upper end portion of the rod 63. Between said rod 63 and the sides of the opening through the sleeve are inserted liner-strips 64 which are held in place longitudinally by means of lugs 65 turned outwardly at the ends thereof and engaging the ends of the sleeve. The liner-strips are made of bronze or other non-corrosible metal, and serve to prevent adhesion of the rod to the sleeve by reason of rusting or corrosion of the contacting surfaces. The rod is caused to be frictionally clamped between the liner-strips by means of a spring 66 which is disposed in a cylindrical lug 67 formed at one side of the sleeve, said spring engaging a saddle-block 68, as shown in Fig. 8, whereby to press said block and the adjacent liner toward the rod, and the latter against the opposite liner. The lower end of the rod 63 has a head 69, in which is a slightly elongated opening for receiving a pin 70 extended out from a bracket 71 secured to the spring-plank 72 of the truck, as shown in Fig. 2. By the described truck-connection to the rocker, the arm 38 is pushed upwardly when the truck-springs 73 are compressed by loading of the car, and when the car is emptied or unloaded the expansion of the truck-springs, by raising the car-body relative to the wheels and the unsprung portion of the truck-frame associated therewith, causes a pull upon the rod 63 which turns the rocker to the normal position shown in Figs. 3, 5 and 9.

The front or outer end of the rod 48 has a forked head 61 to which the rod 28 is connected as shown in Figs. 1 and 2. It will be seen that when the brakes are applied, said rod 28 is placed under tension and will pull upon the rod 48, and that when the swivel-block 54 is in the normal position, shown in Figs. 3 and 5, the pull upon said rod 48 may move the same longitudinally, compressing the spring 52, until the collar 51 engages the end of the guide 47, the lug 58 moving longitudinally over the face of the rail 60, and the lug 55 moving longitudinally in the slot 56 to a position such as shown in Fig. 7. By said movements of the rods 48 and 28, a limited displacement of the fulcrum of the lever 16 is permitted, so that the travel of the brake-piston in applying the brakes is proportionally increased, and the increased piston-travel causes a corresponding reduction of brake-cylinder pressure. The brake mechanism as a whole is so proportioned that under the conditions above mentioned the braking power is suitable for the empty car, the usual practice for freight cars being to provide when the brakes are fully applied a brake-shoe pressure equal to about 70% of the weight of the car.

When the car is loaded, and the truck-springs thereby compressed, so that the upward thrust of the rod 63 moves the rocker to the position shown in Fig. 6, the latch-plate 45 is pressed against the lug 58 of the swivel-block, and the latter is thereby rotated to a position at which said lug 58 enters the notch 59 and the lug 55 enters the notch 57. Then, upon the application of the brakes, longitudinal movement of the rods 28 and 48 is prevented (or limited to the slight clearance between the swivel-lugs and the sides of the notches 57 and 59), the fulcrum of the lever 16 is thus kept substantially stationary, the piston-travel required to apply the brakes is correspondingly reduced, the shortened piston-travel causes less expansion and correspondingly greater pressure of the air admitted to the brake-cylinder, and there is a resulting increase of braking power. The faces of the lugs 55 and 58 which engage the sides of the notches 57 and 59 are slightly beveled, and the corresponding sides of the notches are slightly undercut, so that the pull from the rod 48 upon the swivel-block tends to cause the lugs to enter the notches more deeply rather than to be withdrawn therefrom. Should the brakes be applied when the car is empty or lightly loaded, and the car then loaded while the brakes are so applied, the rocker will be moved as before described, but the swivel-block will not be actuated thereby, because by the application of the brakes on the empty car the lug 58 will have been moved forwardly along the rail 60. Upon releasing the brakes, however, after the car has been loaded and the rocker thereby moved, the pointed rear end of the lug 58 will pass beneath the latch-plate 45, the beveled face of the lug pressing the plate toward the head 41, the latch-pin 42 and spring 46 being pushed outward by the plate 45, until the lug 58 passes the end of the rail 60 and comes into register with the notch 59, whereupon the pressure of the spring 46, transmitted through the latch-pin 42 and plate 45, will rotate the swivel-block to move the lugs into the notches 57 and 59, thus placing the adjuster in the "load" braking position. Should the brakes be applied while the car is loaded, and the car then be unloaded while the brakes remain applied, the rocker will be moved to the normal or "light" braking position shown in Fig. 5, but the engagement of the beveled edges of the lugs 55 and 58 with the undercut sides of the notches 57 and 59 will cause the swivel-block to remain in the "load" position until the brakes are again released, whereupon the pressure of the spring-end 52″ against the lug 58 will move the swivel-block to the normal or "light" position shown in Fig. 5.

It will be understood, of course, that it is desirable to increase the braking power into the "load" range, only when the car is loaded heavily enough so that the increased braking power will not be excessive and endanger sliding of the wheels when the brakes are fully applied; and that such loading of the car will compress the truck-springs sufficiently to cause variations in the car-body and truck-frame considerably greater than are required for actuating the power-adjuster. The excess of movement thus available for operating the adjuster, enables an arrangement which will prevent the adjuster being operated by momentary variations in the relation of the car-body and truck-frame, due to compression and expansion of the truck-springs by swaying and jolting of the car while in transit, or to any similar cause. For the purpose mentioned, the opening for the pin 70 in the head 69 of the rod 63 is elongated vertically as indicated in Fig. 5, to form a slot of such length that the transitory variations above noted will not actuate the rod 63, but will merely cause movements of the pin 70 in the slot.

Permanent variations in the relation of the car-body and truck-frame, due to sag or shortening of the truck-springs, wear and deformations of the truck-frame, shimming up of the spring-seats to aline the car-couplers, and any similar causes, are automatically compensated by variations in the length of the truck-connection formed by the rod 63 and clutch-sleeve 62. The frictional engagement between said parts is sufficient to actuate the rocker between the limits determined by the engagement of the lug 37 with the sides of the opening therefor in the back-plate, and to thus operate the adjuster in accordance with the variations due to loading and unloading of the car; but any excess movement of the rod 63 in either direction, such as may result from the permanent variations above mentioned, will result merely in sliding of the rod through the clutch-sleeve, after the stop-lug 37 has engaged the respective abutment therefor.

It will be seen that the described power-adjusting mechanism provides for variations of three classes in the relative position of the car-body and truck-frame: First, the minor or transitory variations due to sway, jolting and the like, which are of relatively small extent and which produce no effect except movement of the pin 70 in the head 69 of the truck-connection; second, the variations due to loading and unloading of the car, which are greater in extent than the transitory variations first mentioned, and which actuate the rocker to place the adjuster in "load" or "light" position according to the direction in which the variation occurs; and, third, the substantially permanent variations, which are added to or subtracted from those of the second class and thus tend to actuate the rocker beyond the limits allowed by the stop-lug 37, thereby lengthening or shortening the truck-connection by changing the relation of the frictionally connected parts thereof, so that the usual operations of the adjuster are effected by the loading or unloading of the car.

By the use of the swivel-block as an interponent between the slidable rod 48 and the controller, formed by the rocker and truck-connection, the position of said rod 48 and the brake-lever with which it is connected need not be changed by the loading or unloading of the car while the brakes are applied, and excessive stresses upon the control mechanism are thus avoided, while completely automatic operation of the mechanism is attained under all conditions.

Now, having described my invention, what I claim and desire to secure by Letters Patent is:

1. The combination with air-brake mechanism for a railway car, and power-adjusting means operable to vary the braking power of said brake-mechanism, of an actuating member for said power-adjusting means, means limiting motion of said actuating member, and means connected with said actuating member and movable oppositely in direction by variations in the relation of the car-body to the unsprung portions of the truck-frame due to increase and decrease of the load upon the car, said connecting means comprising parts normally held frictionally in fixed relation but variable in relation by excess movement tending to move the actuating member past the motion-limiting means therefor.

2. The combination with air-brake mechanism for a railway car, of adjusting means carried upon the car-body and operable to vary the braking power of said brake mechanism, an actuating member for said adjusting means, means limiting motion of said actuating member, and means connecting said actuating member with the unsprung portion of the car-truck, said connecting means comprising parts frictionally connected and relatively movable to compensate variations in the relation of the car-body and truck of a magnitude tending to cause excessive movement of the actuating member.

3. The combination with the air-brake mechanism of a railway car, of a member associated with the brake-levers and normally yieldable to enable a predetermined motion of the brake-levers in a direction tending to increase the travel of the brake-piston required to apply the brakes, means for restricting the motion of said member to reduce the piston-travel, means controlling said restricting means, means limiting motion of said controlling means, and means connected with said controlling means and movable by variation in the relation of the car-body to the unsprung portions of the car-truck, said connecting means comprising parts frictionally connected and relatively movable to compensate excessive variations in the relation of the car-body and truck.

4. A load-controlled power-adjusting mechanism for air-brakes of railway cars, comprising a member forming a brake-lever-fulcrum, adjusting means connected with said fulcrum-member and normally yieldable to enable during application of the brakes a movement of the lever-fulcrum in a direction tending to increase travel of the brake-piston, means for interrupting said yielding movement of the adjusting means, and means controlled by variation in the relation of the car-body to the truck-frame for actuating said interrupting means to restrict movement of the lever-fulcrum when the load of the car exceeds a determined minimum.

5. A load-controlled power-adjusting mechanism for the air-brakes of railway cars, comprising a frame affixed to the car-body, a member slidable longitudinally in said frame, means for connecting said member with a brake-lever-fulcrum, a spring arranged to hold said slidable member in a determined relation to the frame when the brakes are released, said spring being yieldable to enable limited movement of the brake-lever connection as the brakes are applied, an interponent movable to a position for preventing movement of the slidable member, and means for actuating said interponent to said position, said actuating means being controlled by variation in the relation of the car-body to the truck-frame as the car is loaded.

6. A load-controlled power-adjusting mechanism for the air-brakes of railway cars, comprising a frame affixed to the car-body, a member slidable longitudinally in said frame, means for connecting said member with a brake-lever, a spring normally holding said slidable member in a determined relation to the frame, said spring being yieldable to enable a limited movement of said member when the brake-lever connection is under tension, an interponent associated with the slidable member and movable to a position for preventing movement thereof relative to the frame, and a load-controlled rocker for actuating said interponent.

7. A load-controlled power-adjusting mechanism for the air-brakes of railway cars, comprising a frame affixed to the car-body, a member slidably mounted in said frame, means connecting said member with a brake-lever, a spring normally holding said slidable member in a determined relation to the frame, said spring being yieldable to enable a limited movement of said member when the brake-lever connection is under tension, an interponent associated with the slidable member and movable to a position for preventing movement of said member relative to the frame, yielding means normally holding said interponent in position to allow motion of the slidable member from its normal position, a load-controlled rocker, a latch-plate carried by the rocker and engageable with the interponent to move the same from its normal position while the slidable member is in normal position, said latch-plate being yieldable to enable return of the slidable member to normal position when the rocker is moved to position for actuating the interponent while the slidable member is displaced from its normal position.

8. In a mechanism of the class described, a frame, a rod slidably mounted therein, a spring disposed about said rod and engaging a collar thereon to normally hold the same against a stop, a swivel-block disposed upon said rod and having lugs normally registering with notches in the frame, a portion of the spring engaging said swivel-block and tending to hold the same at a position in which the lugs are disengaged from the notches, and means for actuating the swivel-block to engage the lugs in said notches and thereby prevent longitudinal movement of the rod.

9. A structure as set forth in claim 8, in which the actuating means for the swivel-block comprises a pivotally mounted rocker having an arm extending adjacent to the swivel-block, yieldable means carried upon said rocker-arm and engageable with the swivel-block only when the rod is adjacent to its normal position, and load-controlled means for actuating said rocker.

10. A structure as set forth in claim 8, in which the actuating means for the swivel-block comprises a pivotally mounted rocker having an arm extending adjacent to the swivel-block, means carried upon said arm and engageable with the swivel-block when the rod is adjacent to its normal position, and means for connecting the rocker with a member which is variable in relation thereto by changes of the truck-spring-compression due to loading of a car.

11. The combination with air-brake mechanism for a railway car, and power-adjusting means operable to vary the braking power of said brake mechanism, of a controlling member for said power-adjusting means, means for limiting movement of said controlling member, and means for connecting said controlling member with a part which is variable in relation thereto by changes of the truck-spring-compression due to loading and unloading of the car, said connecting means comprising parts normally clutched together frictionally in fixed relation to each other, and adapted for relative movement by slippage of the frictional clutch when the relation of the connected parts is varied in excess of the amount required to actuate the controlling member.

CHARLES O. ANDERSON.